United States Patent
Obata et al.

(10) Patent No.: US 6,263,857 B1
(45) Date of Patent: Jul. 24, 2001

(54) INTAKE AIR CONTROL SYSTEM OF INTERNAL COMBUSTION ENGINE

(75) Inventors: Takeaki Obata, Kanagawa; Nobutaka Takahashi, Yokohama, both of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/481,683

(22) Filed: Jan. 12, 2000

(30) Foreign Application Priority Data

Jan. 12, 1999 (JP) .................................................. 11-005280

(51) Int. Cl.$^7$ ................................. F02D 9/00; F02D 13/02
(52) U.S. Cl. ......................................... 123/399; 123/90.11
(58) Field of Search ............................. 123/90.11, 90.12, 123/90.15, 352, 361, 399

(56) References Cited

U.S. PATENT DOCUMENTS

| | | | |
|---|---|---|---|
| 4,763,264 | * 8/1988 | Okuno et al. | 123/399 X |
| 4,791,902 | * 12/1988 | Ishikawa et al. | 123/399 |
| 4,799,467 | * 1/1989 | Ishikawa et al. | 123/399 |
| 5,022,357 | * 6/1991 | Kawamura | 123/90.11 |
| 5,870,994 | 2/1999 | Kato | 123/339.15 |

FOREIGN PATENT DOCUMENTS 8-082365   3/1996   (JP) .
9-256823   9/1997   (JP) .

* cited by examiner

*Primary Examiner*—Tony M. Argenbright
(74) *Attorney, Agent, or Firm*—Foley & Lardner (57) ABSTRACT

An intake air control system for an engine having an air intake passage, a throttle valve in the intake passage and an intake valve for selectively opening and closing communication between the intake passage and a cylinder. The control system determines target intake passage pressure and target intake air amount in accordance with engine operating conditions. A target throttle opening is set in accordance with both the target pressure and the target intake air amount. The throttle valve is then driven to the target opening. Intake passage pressure is detected and a target intake valve open/close timing is determined in accordance with both the detected intake passage pressure and the target intake air amount. The intake valve is then driven in accordance with the target open/close timing.

9 Claims, 10 Drawing Sheets

INTAKE AIR CONTROL SYSTEM OF INTERNAL COMBUSTION ENGINE

BACKGROUND OF THE INVENTION

1. Field of the Invention

The present invention relates in general to a control system for controlling operation of an internal combustion engine, and more particularly to an intake air control system that controls the amount of intake air to a target value by adjusting an OPEN/CLOSE timing of each intake valve of the engine.

2. Description of the Related Art

Hitherto, various intake air control systems have been proposed for appropriately controlling the amount of intake air by controlling the operation timing of the intake and exhaust valves.

One of such intake air control systems is shown in Laid-open Japanese Patent Application 9-256823. In the system of this publication, for accuracy with which the open/close operation of each of the intake and exhaust valves is carried out, an electromagnetic type valve actuating unit is used that includes electromagnetic actuators for actuating the intake and exhaust valves. In the engine equipped with such electromagnetic type valve actuating unit, control of the amount of intake air is made by adjusting the time for which each intake valve is opened, irrespective of whether the intake pipe of the engine is of a type equipped with a throttle valve or a type equipped with no throttle valve. Under operation of the engine, the pressure in the intake pipe is kept substantially equal to the atmospheric pressure, and thus the engine shows a less pumping loss as compared with a conventional engine that controls the intake air by using a throttle valve. However, even such engine has failed to adequately satisfy users due to various reasons.

SUMMARY OF THE INVENTION

It is therefore an object of the present invention to provide an intake air control system of an internal combustion engine, which can adequately satisfy users.

It is another object of the present invention to provide an intake air control system of an internal combustion engine, which assures an engine brake under a deceleration condition of an associated motor vehicle.

It is still another object of the present invention to provide an intake air control system of an internal combustion engine, which suppresses or at least minimizes the amount of lubrication oil sucked into the combustion chamber.

In accordance with a first aspect of the present invention, there is provided an intake air control system for use in an automotive engine. The engine has an air intake passage, a throttle valve installed in the air intake passage and an intake valve for selectively opening and closing a communication between the intake passage and a cylinder. The control system comprises a target intake passage pressure setting unit which sets a target pressure in an intake passage of the engine in accordance with an operating condition of the engine; a target intake air amount setting unit which sets a target intake air amount of the engine in accordance with the operating condition of the engine; a target throttle open degree setting unit which sets a target open degree of the throttle valve of the engine in accordance with both the target pressure in the intake passage and the target intake air amount of the engine; a throttle valve drive unit which drives the throttle valve in accordance with the target open degree of the throttle valve; an intake passage pressure detecting unit which detects an existing pressure in the intake passage; a target intake valve OPEN/CLOSE timing setting unit which sets a target OPEN/CLOSE timing of the intake valve in accordance with both the detected existing pressure in the intake passage and the target intake air amount; and an intake valve drive unit which drives the intake valve in accordance with the target OPEN/CLOSE timing of the intake valve.

In accordance with a second aspect of the present invention, there is provided a method for controlling an amount of intake air in an automotive engine. The engine has an air intake passage, a throttle valve installed in the air intake passage and an intake valve for selectively opening and closing a communication between the intake passage and a cylinder. The method comprises setting a target pressure in an intake passage of the engine in accordance with an operating condition of the engine; setting a target intake air amount of the engine in accordance with the operating condition of the engine; setting a target open degree of the throttle valve of the engine in accordance with both the target pressure in the intake passage and the target intake air mount of the engine; driving the throttle valve in accordance with the target open degree of the throttle valve; detecting an existing pressure in the intake passage; setting a target OPEN/CLOSE timing of the intake valve in accordance with both the detected existing pressure in the intake passage and the target intake air amount; and driving the intake valve in accordance with the target OPEN/CLOSE timing of the intake valve.

DETAILED DESCRIPTION OF THE INVENTION

In the following, the present invention will be described in detail with reference to the drawings. For ease of understanding, the description will proceed with the aid of directional words, such as, right, left, upper, lower, rightward, upward and the like. However, it is to be noted that the words are to be understood with respect to only the drawings on which the aimed parts and structures are shown.

Figure 1:
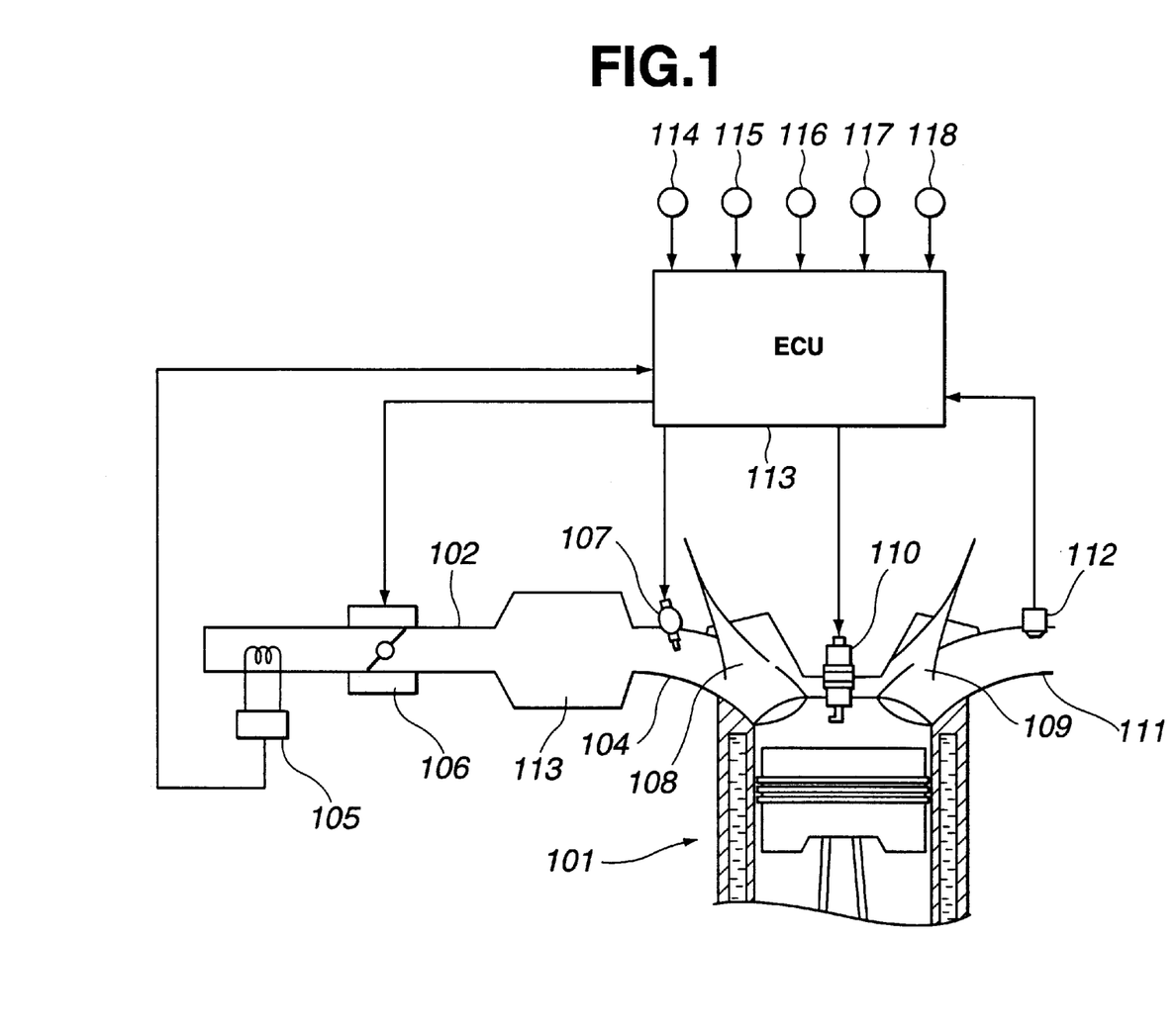
FIG. 1 is a diagrammatic view showing an internal combustion engine to which the present invention is practically applied.

Referring to FIG. 1, there is shown but partially an automotive internal combustion engine 101 to which the present invention is practically applied.

Into each combustion chamber of the engine 101, there is introduced air through an air intake duct 102, an intake air collector 103 and an intake manifold 104. The air intake duct 102 is equipped with an air flow meter 105 for detecting the flow rate of air and an electronically controlled throttle valve 106 for controlling the amount of air fed to the engine 101. Each branch of the intake manifold 104 is equipped with a fuel injection valve 107.

Figure 2:
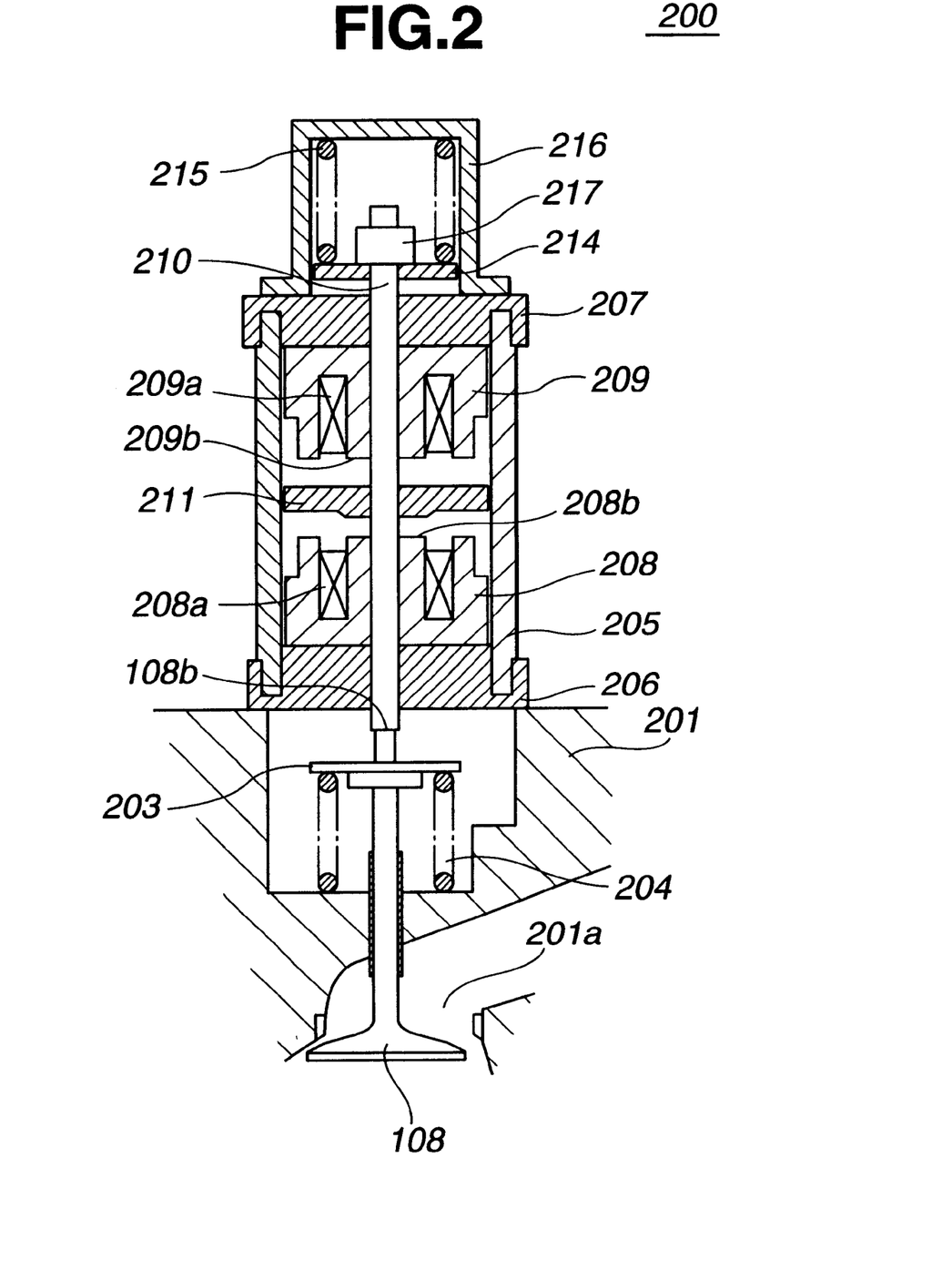
FIG. 2 is a sectional view of an electromagnetic actuator for actuating an intake or exhaust valve of the engine.

Each of intake and exhaust valves 108 and 109 of each cylinder of the engine 101 is actuated by an electromagnetic actuator 200 which is well shown in FIG. 2. A combustion chamber of each cylinder is equipped with an ignition plug 110 to ignite air-fuel mixture fed thereinto. Gas produced in the combustion chamber as a result of combustion of the air-fuel mixture is exhausted into an exhaust manifold 111 through the exhaust valve 109. To a united portion of branches of the exhaust manifold 111, there is connected an air/fuel ratio sensor 112 which senses an exhaust air/fuel ratio by measuring an oxygen concentration in the exhaust gas.

For electronically controlling the throttle valve 106, each of the fuel injection valves 107, each of the ignition plugs 110 and each of the electromagnetic actuators 200 (see FIG. 2), there is employed an engine control unit (ECU) 113 which receives information signals from the air flow meter 105 and the air/fuel ratio sensor 112. Into the engine control unit 113, there are also fed information signals from a crank angle sensor 114, an engine cooling water temperature sensor 115, an intake air temperature sensor 116, an accelerator pedal operation degree sensor 117 and a vehicle speed sensor 118.

The engine control unit (ECU) 113 is a computer which generally comprises a central processing unit (CPU), a random access memory (RAM), a read only memory (ROM), an input interface and an output interface.

Referring to FIG. 2, there is clearly shown the electromagnetic actuator 200 which actuates each of the intake and exhaust valves 108 and 109.

For ease of description, the following explanation will be made with respect to only the electromagnetic actuator 200 applied to the intake valve 108. The other electromagnetic actuator 200 for the exhaust valve 109 and its surrounding structure are substantially the same as those of the actuator 200 for the intake valve 108.

As shown, a stem 108a of the intake valve 108 is slidably received in a bore (no numeral) formed in a cylinder head 201 of the engine 101. The stem 108a has a valve retainer 203 fixed thereto. Between the valve retainer 203 and the cylinder head 201, there is compressed a so-called valve closing spring 204, so that the intake valve 108 is biased upward, that is, in a direction (viz., valve closing direction) to close an intake port 201a of the cylinder head 201.

The electromagnetic actuator 200 is incorporated with the stem 108a of the intake valve 108 in the following manner.

The actuator 200 comprises a cylindrical hollow case that includes a circular base member 206 securely mounted on the cylindrical head 201, a cylindrical member 205 mounted on the base member 206 and a circular head member 207 mounted on the cylindrical member 205. Within the hollow case, two, that is, so-called valve opening and closing electromagnets 208 and 209 are immovably disposed, which are coaxially arranged keeping a given distance therebetween. That is, as shown, an upper surface 208b of the valve opening electromagnet 208 and a lower surface 209b of the valve closing electromagnet 209 face each other with the given distance kept therebetween. Each electromagnet 208 or 209 is equipped with an energizing coil 208a or 209a. Thus, when the coil 208a or 209a is applied with a certain electric current from a drive circuit (not shown), the corresponding electromagnet 208 or 209 generates a magnetic force.

A shaft 210 passes slidably through center portions of the two electromagnets 208 and 209. The shaft 210 is in alignment with the stem 108a of the intake valve 1087, and a lower end of the shaft 210 is in contact with an upper end 108b of the valve stem 108a. The shaft 210 has at its middle portion an armature 211 fixed thereto. The armature is made of a magnetic material. As shown, the armature 211 is located in the space between the two electromagnets 208 and 209. Thus, upon energization of the coil 208a or 209a, the shaft 210 is moved downward or upward.

The shaft 210 has an upper end projected through the head member 207 of the cylindrical hollow case. The projected portion of the shaft 210 is equipped with a spring seat 214. A spring cover 216 is mounted on the head member 207 to house therein the projected portion of the shaft 210 and the spring seat 214. A so-called valve opening spring 215 is compressed between the spring cover 216 and the spring seat 214, so that the shaft 210 is biased downward, that is, in a direction (viz., valve opening direction) to bias the intake valve 108 to open the intake port 201a.

As has been mentioned hereinabove, the shaft 210 is in alignment with the stem 108a of the intake valve 1087, and a lower end of the shaft 210 is in contact with an upper end 108b of the valve stem 108a. Thus, when the shaft 210 is applied with a certain downward force, the shaft 210 pushes down the valve stem 108a and thus moves the intake valve 108 downward to open the intake port 201a, while when the shaft 210 is applied with a certain upward force and thus moved upward, the valve step 108a is moved upward by the force of the valve closing spring 204 until the intake valve 108 closes the intake port 201a.

That is, due to energization of the valve opening or closing electromagnet 208 or 209, the intake valve 108 is moved to open or close the intake port 201a.

As is shown in FIG. 2, a position sensor 217 is arranged in the spring cover 216, which detects a position or displacement of the shaft 210. For example, a potentiometer may be used as such sensor 217.

In the following, a method for controlling the amount of intake air will be described in detail with reference to various flowcharts shown in the drawings.

Figure 3:
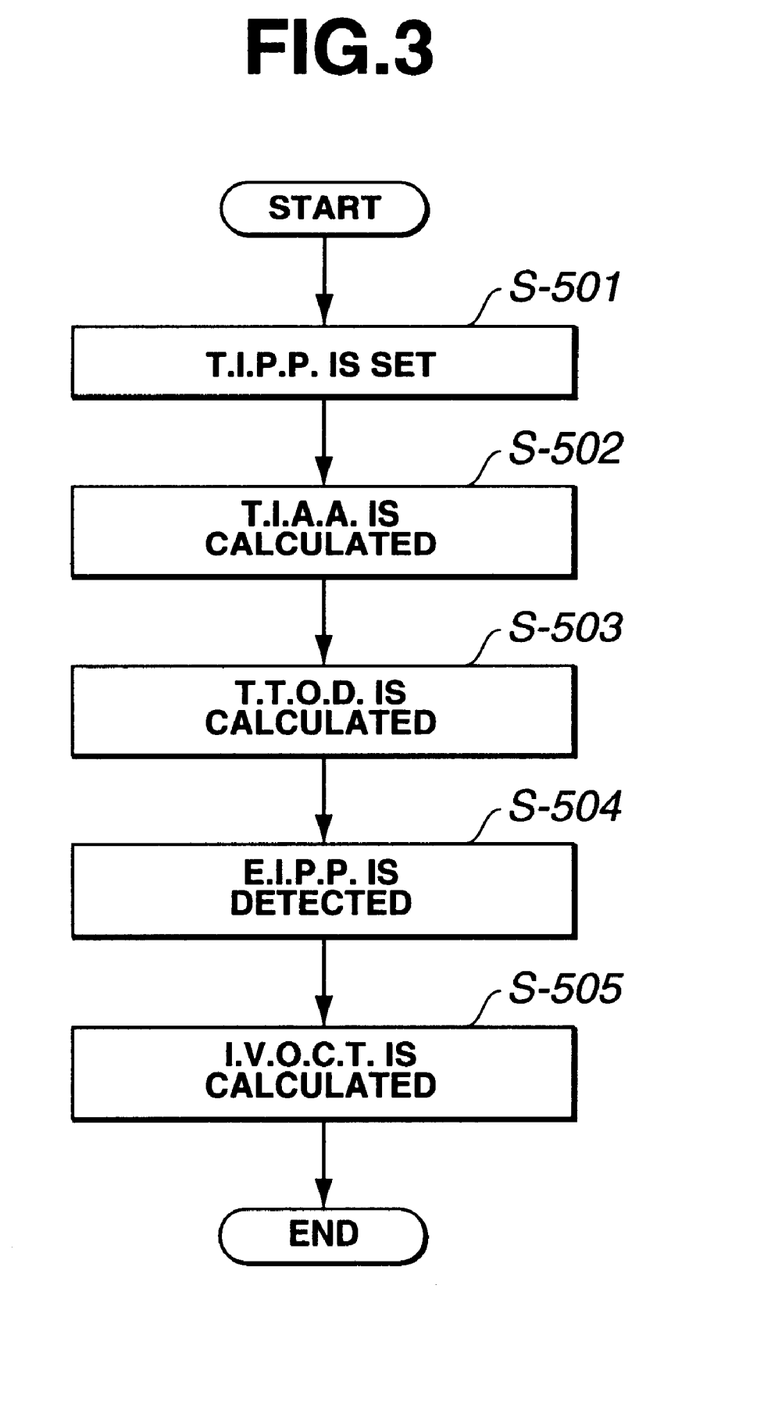
FIG. 3 is a flow chart showing programmed operation steps for carrying out control of the amount of intake air.

FIG. 3 is a flowchart depicting the entire of the control for the amount of intake air.

The control is executed for example every 10 msec.

At step S-501, a target pressure in an intake passage (which will be referred to "target intake passage pressure" hereinafter) is set, at step S-502, a target amount of intake air (which will be referred to "target intake air amount" hereinafter) is calculated, and at step S-503, a target open degree of the throttle valve 106 (which will be referred to "target throttle open degree" hereinafter) is calculated based on both the set target intake passage pressure and the calculated target intake air amount.

At step S-504, a pressure in an intake pipe (which will be referred to "existing intake passage pressure" hereinafter) is detected, and at step S-505, an OPEN/CLOSE timing of the intake valve 108 (which will be referred to "intake valve OPEN/CLOSE timing" hereinafter) is calculated based on both the detected existing intake passage pressure and the calculated target intake air amount.

Figure 4:
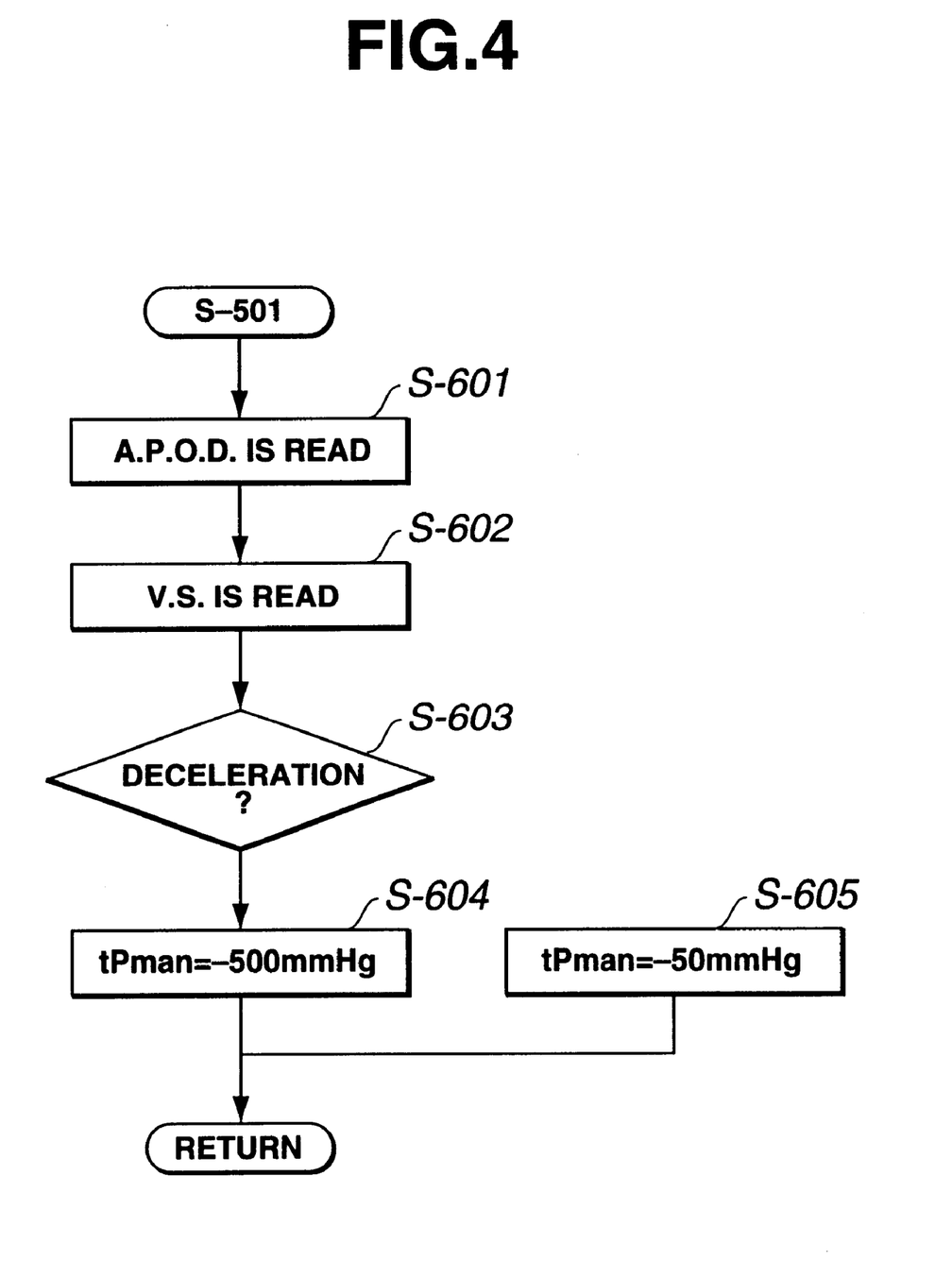
FIG. 4 is a flow chart showing programmed operation steps for setting a target pressure to be created in an intake pipe.

FIG. 4 is a flowchart depicting the detail of the step S-501 of the flowchart of FIG. 3.

That is, at step S-601, an accelerator pedal operation degree is read, and at step S-602, a vehicle speed is read. At step S-603, based on both the accelerator pedal operation degree and the vehicle speed, a judgement is carried out as to whether the associated motor vehicle is under a deceleration condition or not, that is, if a driver requires a deceleration (viz., engine brake) of the vehicle or not. If YES, that is, when the accelerator pedal operation degree is smaller than a predetermined degree and the vehicle speed exceeds a predetermined speed, the operation flow goes to step S-604. That is, under the deceleration condition, a negative driving force is needed. At step 5-604, the target intake passage pressure is set to a relatively low pressure such as −500 mmHg or so. While, if NO at step S-603, that is, when it is judged that the vehicle is not under the deceleration condition, the operation flow goes to step S-605. At this step, the target intake passage pressure is set to a relatively high pressure such as −50 mmHg or so.

In the above-mentioned flow, the deceleration of the vehicle (viz., requirement for engine brake by the driver) is judged based on the accelerator pedal operation degree. If desired, such judgement may be carried out based on both the accelerator pedal operation degree and actual operation of a brake pedal by the driver, or based on only the actual operation of the brake pedal.

Furthermore, if the vehicle is of a type equipped with a vehicle navigation system including GPS (viz., global positioning system), an addition step may be employed wherein a deceleration of the vehicle is forecasted based on a map information given by the navigation system. That is, if the map shows a curve or a down road on the course of the vehicle, the deceleration of the vehicle can be forecasted. In this case, the target intake passage pressure is set to a lower level. Furthermore, if the navigation system is equipped with a vehicle-information-communication-system (viz., VICS), such forecasting may be effected by using information given by this system.

Furthermore, if the vehicle is equipped with a system which is disclosed in Laid-open Japanese Patent Application 8-82365, the following measure may be used for judging the need of deceleration. That is, in the system, when, during running down on a down road, a vehicle is subjected to a manual shift down operation, such shift down operation is learned and memorized together with a position of the vehicle detected by a navigation system, and when the vehicle comes to the position again during running down on the same down road, a shift down operation is automatically carried out. That is, this automatic shift down operation can be used as an indication of the need of deceleration of the vehicle. Upon receiving such indication, the target intake passage pressure is set to a lower level.

Figure 5:
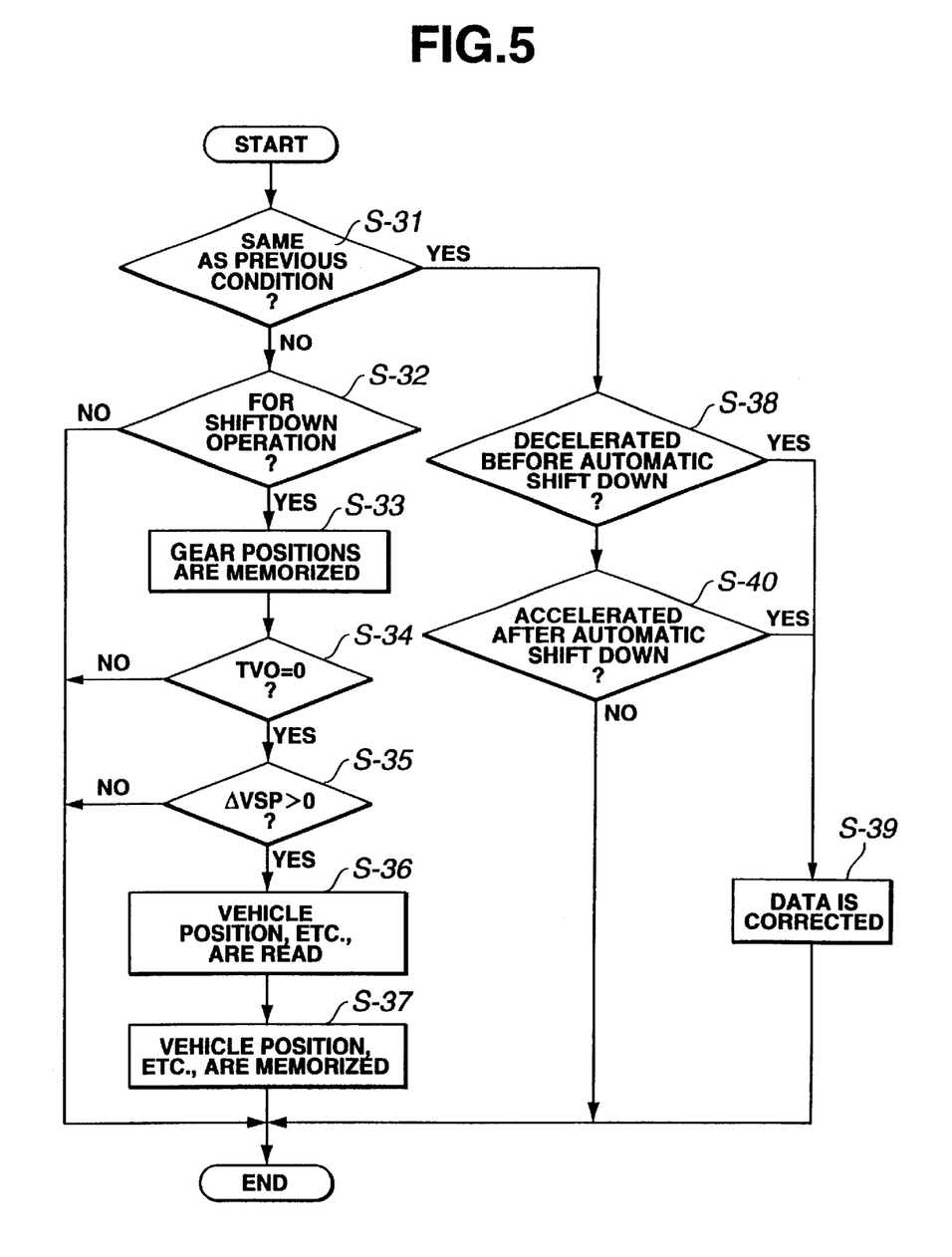
FIG. 5 is a flowchart showing programmed operation steps for learning a position of an associated motor vehicle where a manual shift down is carried out.

FIG. 4 shows a flowchart depicting the learning of the position of the vehicle executed when the vehicle is subjected to a manual shift down operation.

At step S-31, a judgement is carried out as to whether or not the existing condition of the vehicle is substantially the same as that assumed when a previous manual shift down operation was carried out. That is, when, with the accelerator pedal operation degree "TVO" being 0 (zero), the vehicle position, the gear position and the vehicle speed changing rate "$\Delta$VSP" are the same as those taken at the previous manual shift down operation, it is judged that the existing condition of the vehicle is the same as that assumed at the previous manual shift down operation.

The reason of adopting the sameness in the vehicle speed changing rate "$\Delta$VSP" is as follows. That is, during cruising of a vehicle on a down road, the accelerator pedal operation degree is almost 0 (zero) until the time when a driver effects a manual shifts down operation for achieving an engine brake, and thus, if the vehicle position is the same, the change of the vehicle speed "VSP" from the value shown at the previous shift down operation indicates a predetermined positive value irrespective of variation of the drivers.

If NO at step S-31, that is, when the judgement is so made that the existing condition of the vehicle is not the same as that assumed at the previous manual shift down operation, the operation flow goes to step S-32. At this step, a judgement is carried out as to whether a select lever manipulation currently effected by the driver is intended for a shift down operation or not. If NO, that is, when the select lever manipulation is not intended for the shift down operation, the operation flow goes to END. While, if YES at step S-32, that is, when the select lever manipulation is intended for the shift down operation, the operation flow goes to step S-33. At this step, gear positions assumed before and after the current manual shift down operation are memorized. Then, at step S-34, a judgement is carried out as to whether the accelerator pedal operation degree "TVO" is 0 (zero) or not. If NO, that is, when the degree "TVO" is not0 (zero), the operation flow goes to END. While, if YES at step S-34, the operation flow goes to S-35. At this step, a judgement is carried out as to whether the vehicle speed changing rate "$\Delta$VSP" is greater than 0 (zero) or not. If NO, that is, when the vehicle speed changing rate "$\Delta$VSP" is smaller than 0 (zero), the operation flow goes to END. While, if YES, that is, when the vehicle speed changing rate "$\Delta$VSP" is greater than 0 (zero), the operation flow goes to step S-36. At this step, a current vehicle position and a travelling direction measured by the vehicle navigation system are read and memorized. Then, the operation flow goes to step S-37. At this step, the current vehicle position, the vehicle speed changing rate "$\Delta$VSP" and the above-mentioned gear positions are newly memorized as a learned data on the position where the driver has needed the deceleration (viz., shift down operation) of the vehicle.

The learned and memorized data at step S-37 is looked up when the vehicle passes through the same position. When, upon this, with the accelerator pedal operation degree being 0 (zero), an existing gear position and an existing vehicle speed changing rate "$\Delta$VSP" are the same as those of the learned and memorized data, a shift down operation is automatically carried out with the same shift pattern as that taken when the manual shift down operation was carried out. For achieving this shift down operation, the target intake passage pressure is set to a lower level, judging the need of deceleration of the vehicle.

If YES at step S-31, that is, when the existing condition of the vehicle is judged substantially the same as that assumed when the previous manual shift operation was carried out, the operation flow goes to step S-38. At this step, based on the result of learning of the manual shift down operation, a judgement is carried out as to whether or not the vehicle has been subjected to a deceleration before the automatic shift down operation. In fact, this judgement is made by carrying out a judgement whether or not the vehicle has been braked by shifting the select lever in the direction to achieve the shift down operation or depressing the brake pedal. If YES, that is, when the vehicle has been subjected to a deceleration before the automatic shift down operation, the operation flow goes to step S-39. At this step S-39, the learned data is so corrected that the position where the automatic shift down operation is carried out is set much backward, that is, the time when the automatic shift down operation is carried out comes much earlier. While, if NO at step S-38, that is, when the vehicle has not been subjected to a deceleration before the automatic shift down operation, the operation flow goes to step S-40. At this step, a judgement is carried out as to whether or not the vehicle has been subjected to an acceleration after the automatic shift down operation. If NO, that is, when the vehicle has not been subjected to an acceleration after the automatic shift down operation, the operation flow goes to END. While, if YES at step S-40, that is, when the vehicle has been subjected to an acceleration after the automatic down shift operation, the operation flow goes to step S-41. At this step, the learned data is so corrected that the position where the automatic shift down operation is carried out is set much forward, that is, the time when the automatic shift down operation is carried out comes much later.

Figure 6:
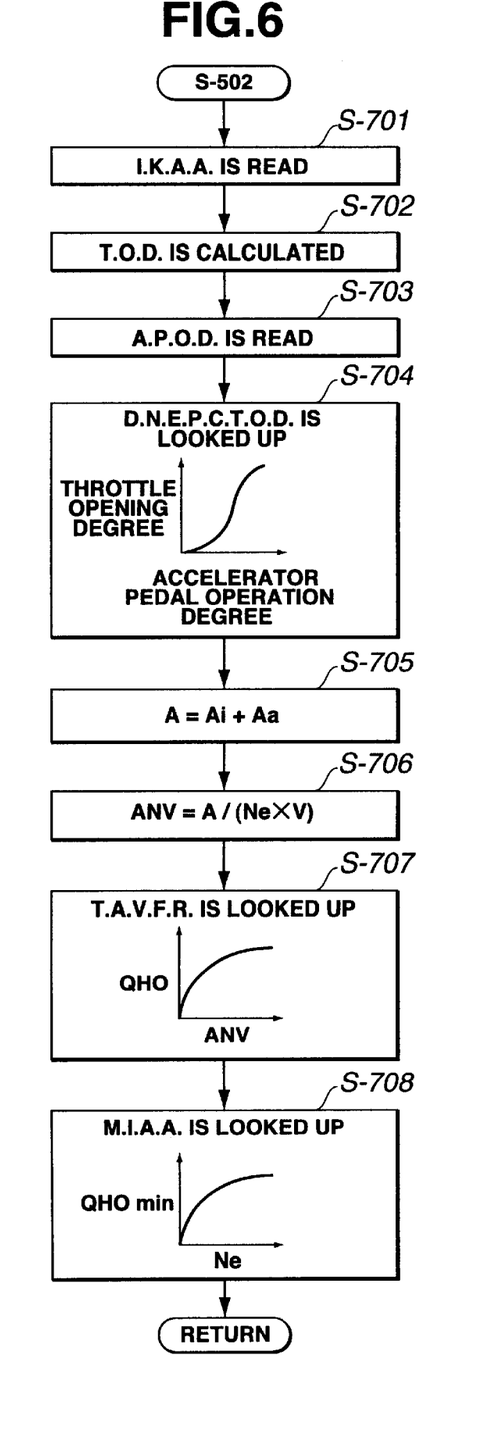
FIG. 6 is a flowchart showing programmed operation steps for setting a target amount of intake air.

FIG. 6 is a flowchart depicting the detail of the step S-502 of the flowchart of FIG. 3.

That is, at step S-701, the amount of intake air (which will be referred to "idling keeping air amount" hereinafter) needed for keeping an idling condition of the engine is read. That is, the idling keeping air amount is the air amount that is needed when, due to deceleration of the vehicle, the fuel injection is suspended. More specifically, the idling keeping air amount is so set as to produce an engine power that does not produce a marked shock when the fuel injection is restarted. At step S-702, a throttle opening degree "Ai" for achieving the idling keeping air amount is calculated. That is, the throttle opening degree "Ai" is calculated from the following equation (1):

$$Ai = IKAM \times K \quad (1)$$

wherein:

IKAM: idling keeping air amount.

K: factor representing a relation between the amount of intake air passing through the throttle valve at a sonic speed and the open degree of the throttle valve.

At step S-703, the accelerator pedal operation degree is read, and at step S-704, a throttle opening degree "Aa" (which will be referred to "driver needed engine power corresponding throttle opening degree") actually needed by a driver is looked up from a data map which shows a relation between the accelerator pedal operation degree and the throttle opening degree.

At step S-705, a throttle opening degree "A" is calculated from the following equation (2):

$$A = Ai + Aa \quad (2)$$

At step S-706, the following equation (3) is executed.

$$ANV = A/(Ne \times V) \quad (3)$$

wherein:

Ne: engine speed.

V: engine displacement.

At step S-707, a target air volume flowing rate "tQHO" corresponding to the derived "ANV" is looked up from a data map which shows a relation between a target air volume flowing rate (viz., rate of the volume of intake air in a normal condition to a stroke volume) and the target intake air amount. The data map used in this step S-707 is provided with reference to an engine having conventional cam actuated intake valves each having a top dead center at its opening time and a bottom dead center at its closing time.

At step S-708, a lower limit "QHOmin" of the intake air amount (which will be referred to "minimum intake air amount" hereinafter) that allows the amount of lubrication oil sucked into each combustion chamber to be within a permitted range is calculated, and when the target air volume flowing rate "tQHO" derived at step S-707 is smaller than the minimum intake air amount "QHOmin", the minimum intake air amount "QHOmin" is set to the target air volume flowing rate "tQHO". For ease of description, the amount of lubrication oil sucked into the combustion chamber will be referred to "amount of sucked lubrication oil" hereinafter. In general, the amount of sucked lubrication oil is determined by the pressure in the chamber and the minimum pressure in the combustion chamber at the bottom dead center is determined by the intake air amount. Thus, the minimum intake air amount "QHOmin" may be set to an amount given when the pressure in the combustion chamber at the bottom dead center shows an allowable minimum value. Since the timing of intake and expansion strokes varies in accordance with the engine speed, the minimum intake air amount "QHOmin" is looked up from a data map based on the engine speed "Ne".

Figure 7:
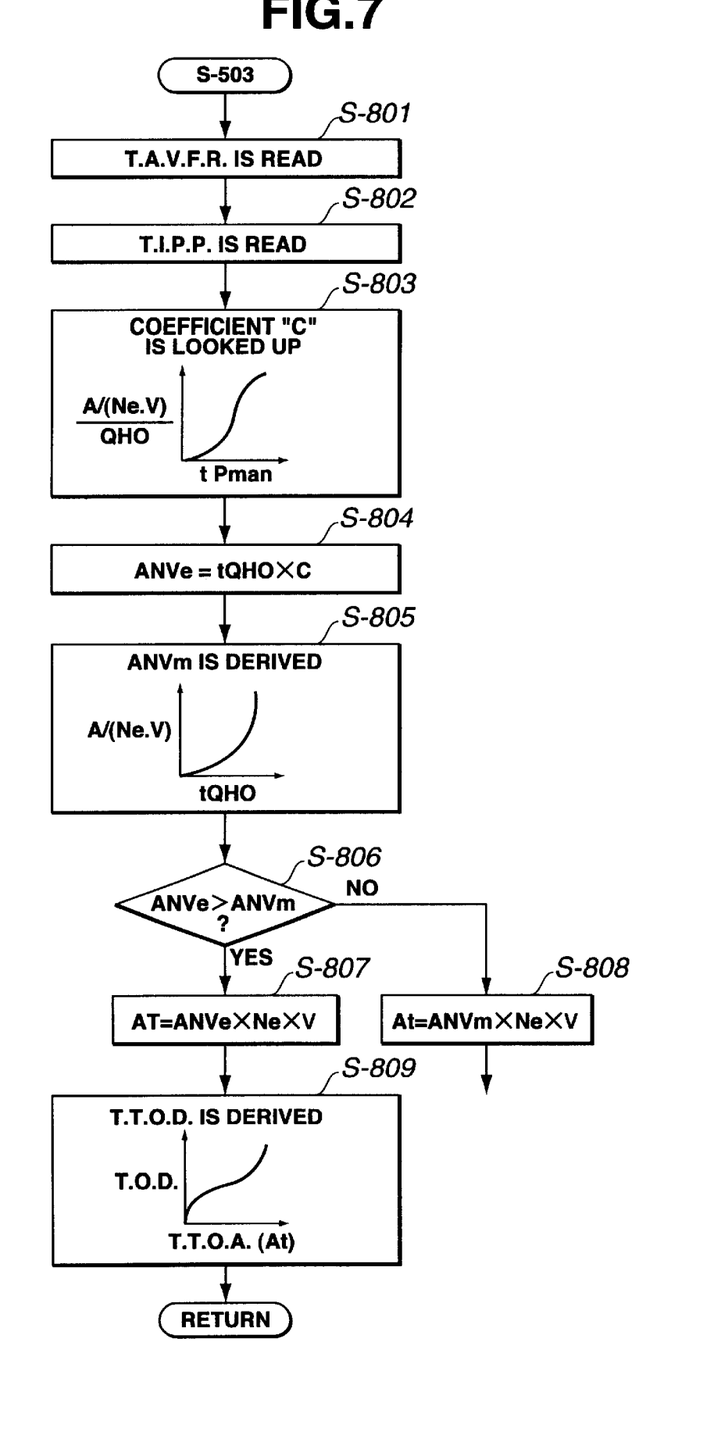
FIG. 7 is a flowchart showing programmed operation steps for calculating a target open degree of a throttle valve.

FIG. 7 is a flowchart depicting the detail of the step S-503 of the flowchart of FIG. 3.

At step S-801, the target air volume flowing rate "tQHO" is read, and at step S-802, the target intake passage pressure "tPman" is read.

For easy understanding the subsequent steps S-803 to S-808, the graph of FIG. 8 will be described in the following.

Figure 8:
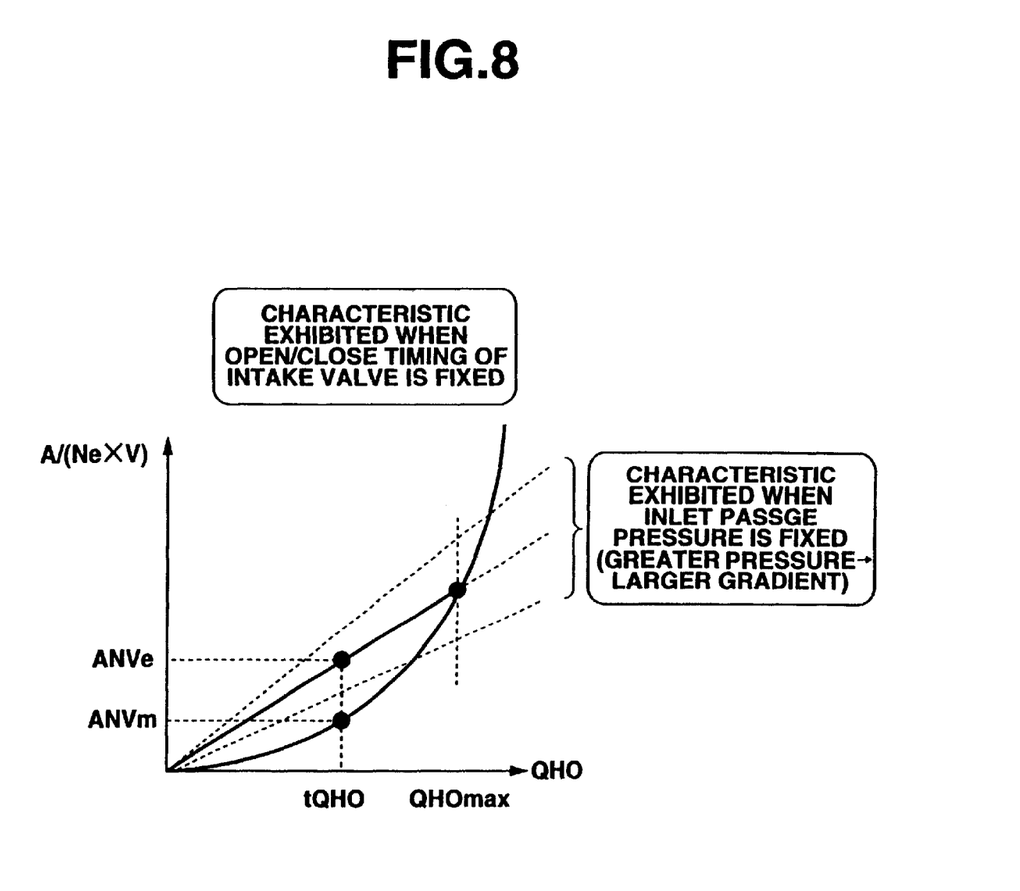
FIG. 8 is a graph showing a correlation between "A/(Ne·V)" and a target volume flow rate.

When the existing intake passage pressure is kept constant, the value "ANV" (that is, A/(Ne×V)) and the air volume flowing rate "QHO" have a proportional relation, as is represented by a solid straight line in FIG. 8. In deriving the throttle opening degree "A" that induces the target intake passage pressure, consideration should be paid to a fact that the intake air amount that is given by controlling the opening/closing timing of the intake valve with the pressure kept in the intake passage has an upper limit "QHOmax" (which will be referred to "maximum intake amount" hereinafter). Thus, to the needed intake air amount greater than the maximum intake amount "QHOmax", the closing time "IVC" (which will be referred to "intake valve closing time" hereinafter) of the intake valve is fixed to the bottom dead center "BDC" to raise the existing intake passage pressure higher than the target value. For effecting this measure, the following operation steps are carried out.

Referring back to FIG. 7, at step S-803, the gradient of the solid line of FIG. 8 (viz., rate of "ANX" to "QHO" at the time when the existing intake passage pressure is kept constant) is looked up from a previously provided data map based on the target intake passage pressure "tPman". That is, coefficient "C" is derived.

At step S-804, the target air volume flowing rate "tQHO" and the above-mentioned gradient are multiplied together to provide a value "A/(Ne×V)" at the target intake passage pressure, and the value "A/(Ne×V)" is set to "ANVe".

At step S-805, a value "A/(Ne×V)" in case wherein the intake valve closing time "IVC" is fixed to the bottom dead center "BDC" is derived with reference to a solid curve shown in the graph of FIG. 8, and the value "A/(Ne×V)" is set to "ANVm".

At step S-806, a comparison between the "ANVe" and the "ANVm" is carried out. If the "ANVe" is greater than the "ANVm", the operation flow goes to step S-807 where the following equation (4) is carried out for obtaining a target throttle opening area "At":

$$At = ANVe \times Ne \times V \quad (4)$$

While if the "ANVe" is smaller than the "ANVm" at step S-906, the operation flow goes to step S808 where the following equation (5) is carried out for obtaining the target throttle opening area "At":

$$At = ANVm \times Ne \times V \quad (5)$$

At step S-809, by looking up a data map that shows a relation between the target throttle opening area "At" and the throttle opening degree, the target throttle opening degree is derived. The engine control unit (ECU) 113 (see FIG. 1) feeds the electronically controlled throttle valve 106 with an instruction signal based on the target throttle opening degree to cause the valve 106 to take the target throttle opening degree.

Figure 9:
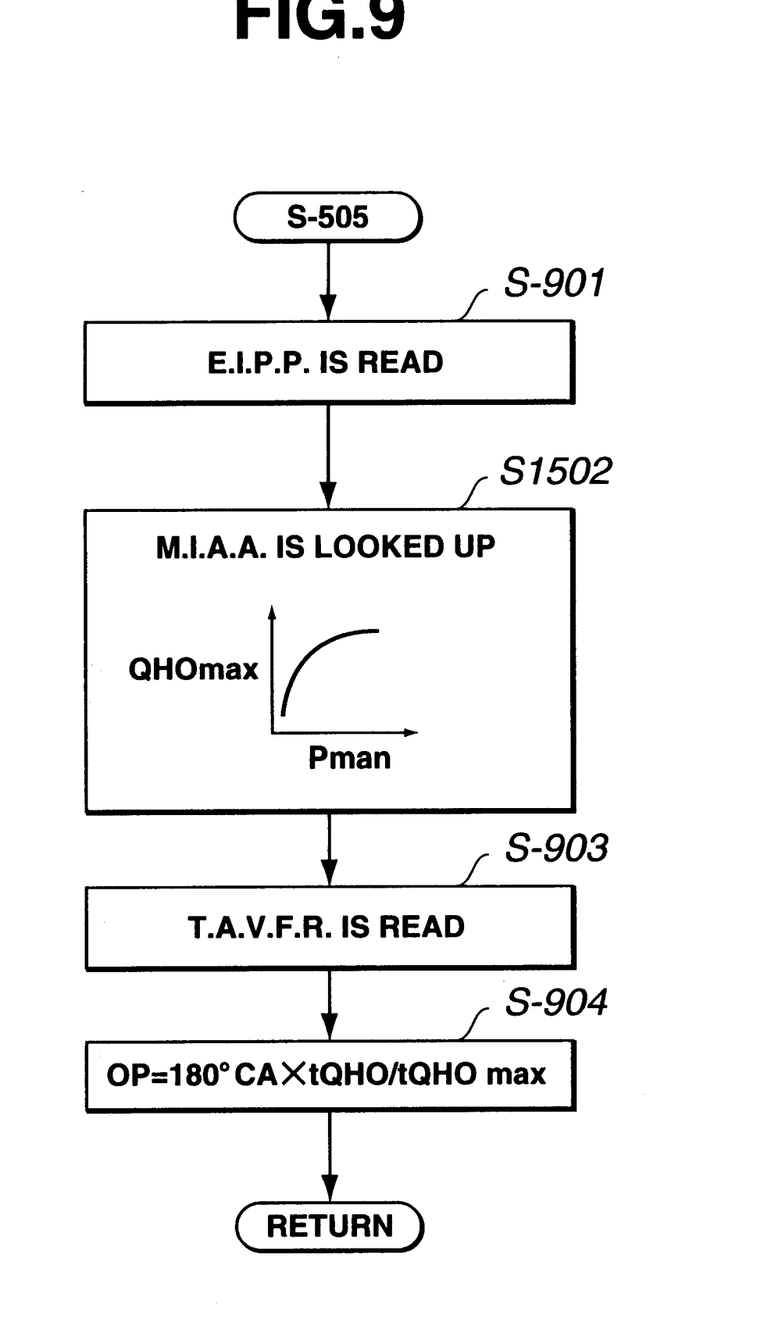
FIG. 9 is a flowchart showing programmed operation steps for calculating OPEN/CLOSE timing of the intake valve.

FIG. 9 is a flowchart depicting the detail of the step S-505 of FIG. 3. In the present invention, the opening time "EVO" of each exhaust valve is set at the bottom dead center "BDC", the closing time "EVC" (which will be referred to "exhaust valve closing time" hereinafter) of the exhaust valve is set at the top dead center "TDC", the opening timing "IVO" of each intake valve is set at the top dead center "TDC" and the intake valve closing time "IVC" is derived from the steps shown in the flowchart of FIG. 9.

At step S-901, the existing intake passage pressure "Pman" is read. For detecting the existing intake passage pressure, a pressure sensor (not shown) is connected to the intake manifold 104 (see FIG. 1). Or, if desired, estimation technique may be used. That is, by carrying out a real test, a data map is prepared which shows characteristic of a relation between the opening degree of the throttle valve 106 and the pressure in the air intake duct 102, and the characteristic is subjected to an approximation of first-order lag, and a first-order lag treatment is applied to the target intake passage pressure to estimate the existing intake passage pressure actually shown in the air intake duct 102.

At step S-902, the maximum intake air amount "QHOmax" under the pressure "Pman" is derived. This is carried out by looking up a data map that shows a relation between the maximum intake air amount "QHOmax" and the pressure in the intake duct 102.

At step S-903, the target air volume flowing rate "tQHO" is read, and at step S-904, based on both the target air volume flowing rate "tQHO" and a maximum intake air amount "tQHOmax" of the target air volume flowing rate, the open period "OP" of the intake valve is derived. Using this open period "OP", the intake valve closing time is derived. The open period "OP" of the intake valve is calculated from the following equation (6):

$$OP = 180°CA \times tQHO / tQHOmax \quad (6)$$

The engine control unit (ECU) 113 (see FIG. 1) feeds each electromagnetic actuator 200 (see FIG. 2) with an instruction signal based on the derived intake valve closing time, so that the intake valve 108 is opened at the top dead center and closed at the derived closing time.

As is described hereinabove, in the present invention, the throttle opening degree and the intake valve closing time "IVC" under deceleration of the vehicle are calculated for controlling the amount of intake air. Advantages given by such calculation will be described with the aid of FIG. 10 in the following.

Figure 10:
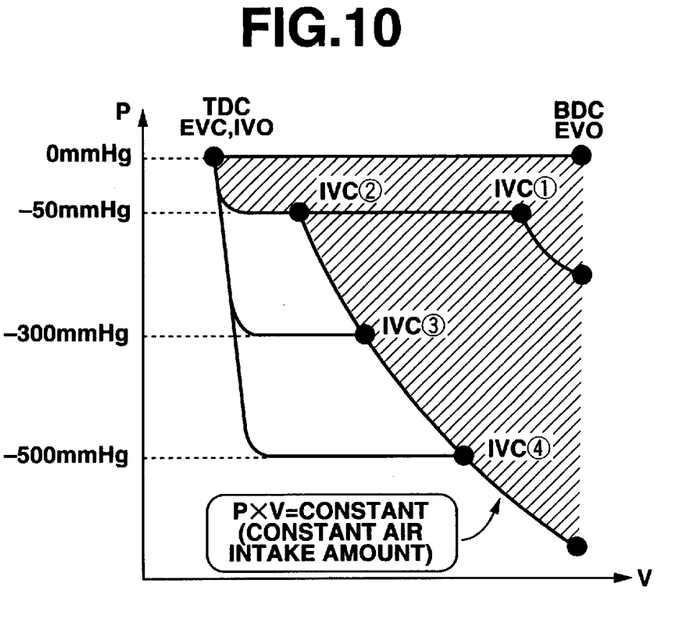
FIG. 10 is a graph showing a correlation between a combustion chamber pressure and a cylinder volume with respect to CLOSE timing of the intake valve.

For ease of understanding, let us assume that just before a deceleration, the vehicle is running under a condition wherein the existing intake passage pressure is for example −50 mmHg and the intake valve closing time "IVC" is "IVC(1)". When now the vehicle is decelerated, the target intake passage pressure becomes set to for example −500 mmHg to reduce the throttle opening degree.

At the same time, the intake valve closing time "IVC" becomes set to a value corresponding to an intake air amount that allows the amount of sucked lubrication oil to be within a predetermined allowable range. In other words, in the graph of FIG. 11, the intake valve closing time "IVC" is set to trace the curve defined by "P×V=constant" which represents a constant intake air amount decided by the amount of sucked lubrication oil. Accordingly, as is shown in the graph, the intake valve closing time "IVC" transfers to "IVC(2)", "IVC(3)" and "IVC(4)". It is to be noted that the hatched area represents the negative driving force of the engine.

Figure 11:
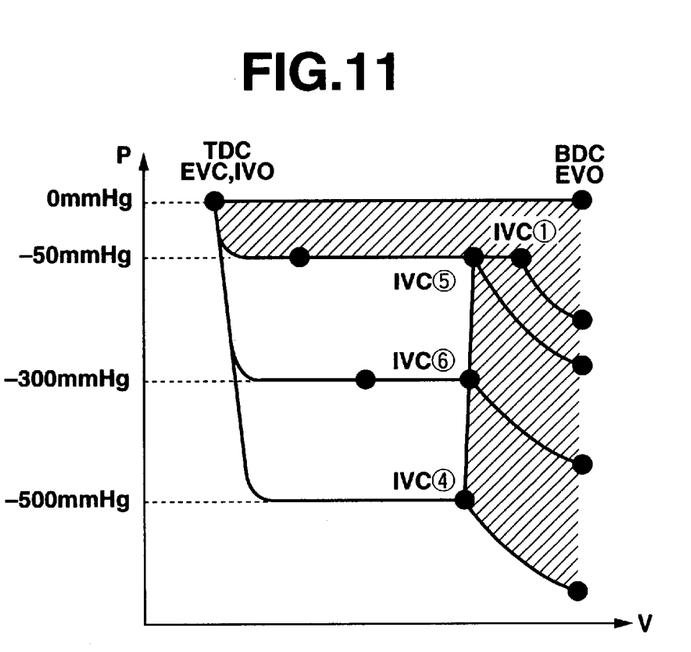
FIG. 11 is a graph similar to FIG. 10 but showing a case wherein the CLOSE timing of the intake valve is calculated based on the target pressure in the intake pipe.

While, if the intake valve closing time "IVC" is derived based on the target intake passage pressure, the intake valve closing time "IVC" is forced to transfer to "IVC(5)", "IVC(6)" and "IVC(4)" of the graph of FIG. 11. As will be seen from this graph, the hatched area is smaller than that of FIG. 10. This means that the negative driving force of the engine produced in the present invention is greater than that obtained when the intake valve closing time "IVC" is derived based on the target intake passage pressure.

As is understood from the foregoing description, according to the intake air control system of the present invention, under a deceleration condition of the vehicle, sufficient negative driving force can be obtained keeping the sucked lubrication oil within an allowable amount.

The entire contents of Japanese Patent Application P11-5280 (filed Jan. 12, 1999) are incorporated herein by reference.

Although the invention has been described above with reference to a certain embodiment of the invention, the invention is not limited to such embodiment. Various modifications and variations of such embodiment will occur to those skilled in the art, in light of the above teachings;

What is claimed is:

1. In an engine having an air intake passage, a throttle valve installed in said air intake passage and an intake valve for selectively opening and closing a communication between the intake passage and a cylinder, an intake air control system comprising:

a target intake passage pressure setting unit which sets a target pressure in the intake passage of the engine in accordance with an operating condition of the engine;

a target intake air amount setting unit which sets a target intake air amount of the engine in accordance with the operating condition of the engine;

a target throttle open degree setting unit which sets a target open degree of the throttle valve of the engine in accordance with both said target pressure in the intake passage and said target intake air amount of the engine;

a throttle valve drive unit which drives said throttle valve in accordance with said target open degree of the throttle valve;

an intake passage pressure detecting unit which detects an existing pressure in said intake passage;

a target intake valve OPEN/CLOSE timing setting unit which sets a target OPEN/CLOSE timing of the intake valve in accordance with both the detected existing pressure in said intake passage and said target intake air amount; and an intake valve drive unit which drives said intake valve in accordance with said target OPEN/CLOSE timing of the intake valve.

2. An intake air control system as claimed in claim 1, in which said target intake passage pressure setting unit sets the target pressure in the intake passage at a smaller value when deceleration of an associated motor vehicle is needed.

3. An intake air control system as claimed in claim 1, in which said target intake passage pressure setting unit sets the target pressure in the intake passage at a smaller value when need of deceleration of an associated motor vehicle is forecasted.

4. An intake air control system as claimed in claim 3, in which the forecast of the need of deceleration of the motor vehicle is made based on a road on and along which the vehicle is running.

5. An intake air control system as claimed in claim 1, in which said target intake air amount is set higher than a predetermined lower limit.

6. An intake air control system as claimed in claim 2, in which said target intake air amount setting unit sets a target intake air amount needed when the deceleration of the vehicle takes place.

7. An intake air control system as claimed in claim 4, in which said target intake air amount setting unit sets a target intake air amount needed when the deceleration of the vehicle takes place.

8. An intake air control system as claimed in claim 1, in which said target throttle open degree setting unit sets a target open degree of the throttle valve needed for obtaining said target pressure in the intake passage and sets, as a final target open degree of the throttle valve, the largest open degree needed for obtaining said target intake air amount of the engine when the OPEN/CLOSE timing of said intake valve is set to a predetermined value corresponding to the largest operation angle of the intake valve.

9. In an engine having an air intake passage, a throttle valve installed in said air intake passage and an intake valve for selectively opening and closing a communication between the intake passage and a cylinder, method for controlling an amount of intake air, comprising:

setting a target pressure in an intake passage of the engine in accordance with an operating condition of the engine;

setting a target intake air amount of the engine in accordance with the operating condition of the engine;

setting a target open degree of the throttle valve of the engine in accordance with both said target pressure in the intake passage and said target intake air mount of the engine;

driving said throttle valve in accordance with said target open degree of the throttle valve;

detecting an existing pressure in said intake passage;

setting a target OPEN/CLOSE timing of the intake valve in accordance with both the detected existing pressure in said intake passage and said target intake air amount; and driving said intake valve in accordance with said target OPEN/CLOSE timing of the intake valve.

* * * * *